3,087,959
SOLUBLE BORAX INHIBITOR
Charles B. Jordan, Aberdeen, Md., assignor to the United States of America as represented by the Secretary of the Army
No Drawing. Filed Feb. 23, 1961, Ser. No. 91,285
4 Claims. (Cl. 260—462)
(Granted under Title 35, U.S. Code (1952), sec. 266)

The invention described herein may be manufactured and used by or for the Government for governmental purposes without the payment to me of any royalty thereon.

This invention relates to a composition of matter soluble in and suitable for use as a corrosion inhibitor for antifreezes, brake fluids and related fluids.

It has been the practice to use borax, sodium tetraborate decahydrate $Na_2B_4O_7 \cdot 10H_2O$, as a corrosion inhibitor for certain hydraulic fluids and antifreezes, either singly or in combination with antioxidants and other inhibitors. Borax is an ionizable inorganic material, therefore its solubility is limited.

A primary object of the invention is to provide a treatment which will permit the solution of a borate in fluids and fluid components, which heretofore have not been considered possible by conventional means.

Another object of this invention is to provide a suitable composition of material which renders these fluids non-corrosive to tin, steel, aluminum, cast iron, brass, copper and solder, when these are separate or in contact with one another. Thus a wider selection of solvents and materials will be made available for use in automotive brake systems and cooling systems and better protection against corrosion will be possible.

The preferred composition consists of two common, inexpensive, and available chemicals, namely borax (sodium tetraborate decahydrate) and 1,2-propylene glycol, both of which have heretofore been used as constituents of brake fluids and antifreeze mixtures. Sodium tetraborate decahydrate is a white inorganic crystalline solid while 1,2-propylene glycol ($CH_2OHCHOHCH_3$, 1,2-dihydroxy-propane) is a colorless, stable, hygroscopic, organic liquid with a boiling point of about 188° C., and a specific gravity of about 1.038 at 19.4° C. Sodium tetraborate pentahydrate may be substituted in equimolar quantities for the sodium tetraborate decahydrate, and anhydrous sodium tetraborate may also be substituted for the decahydrate if approximately 10 moles of water per mole of borate is added to the glycol before the addition of the borate. Ethylene glycol or 1,3-propylene glycol may also be substituted for the 1,2-propylene glycol.

While these chemicals have individually been used before in brake fluids and antifreeze formulations, the method of their combination and treatment, to permit the use of the resultant material as a corrosion inhibitor in materials which heretofore have not dissolved borax as such, is the essence of this invention.

The preferred treatment to accomplish the objects of this invention and obtain the desired results is found in the following procedure.

A suitable quantity of 1,2-propylene glycol is placed in a container which has a stirrer and a thermometer inserted in the liquid and is itself inclosed in a variable temperature heating mantle. The stirrer is started and heat is applied until the liquid reaches and maintains a temperature of 85° ±5° C. Powdered borax (sodium tetraborate decahydrate) is added to the container in three equal increments, each amounting to approximately 10% by weight of the 1,2-propylene glycol. Heating at 85°±5° C. and stirring is continued after each of the first two additions until the mixture becomes clear. After the third portion of borax has been added, the temperature of the mixture is raised to about 105° C. and held for three hours to form a soluble condensate of 1,2-propylene glycol and borax. The resultant liquid, which is the preferred composition of materials of this invention is clear, colorless, and viscous, and analyzes 14.0±1.0% borate by weight calculated as sodium tetraborate. Other compositions involving low molecular weight glycols other than 1,2-propylene glycol and sodium tetraborates, other than the decahydrate may be prepared by the same procedure.

It is of utmost importance that the borate be added in small portions, allowing each portion to dissolve before the next portion is added, while maintaining a constant temperature of 85°±5° C. until the last portion has been added, and then raising the temperature to 105° C.±2° C. and holding that temperature for three hours to form a soluble condensate of the glycol and borax.

Other compositions involving sodium tetraborate and 1,2-propylene glycol may consist of any amount of borate .1% to 15.0% borate by weight, calculated as sodium tetraborate. Compositions involving sodium tetraborate and 1,3-propylene glycol may consist of any amount of borate from 0.1% to 13.5% borate by weight, calculated as sodium tetraborate. Compositions involving sodium tetraborate and ethylene glycol may consist of any amount of borate from 0.1% to 27% borate by weight, calculated as sodium tetraborate.

Normally corrosiveness of brake fluids is determined by tests involving six metals, such as tin, steel, aluminum, cast iron, brass and copper, which are connected and immersed in the fluids for a period of 120 hours at 210° C. After that period, the metals are removed from the fluid, inspected and weighed. In order to satisfactorily pass such tests, no pitting or etching and very little discoloration or weight loss of the strips, is permitted. In order to meet these requirements, inhibitor combinations in satisfactory brake fluids usually consist of one or more phenolic type antioxidants, and an alkaline material. The alkaline material may be an amine, a soap, or a borax. Brake fluid solvents include alcohols, glycols, and glycol ethers. Brake fluid base lubricants include castor oil and its derivatives, synthetic polyoxyglycols, or mixtures of these materials. Borax is soluble in the lower molecular weight glycols and slightly soluble in the polyoxyglycols, but is insoluble in the other solvents and castor oil derivatives. Thus when a brake fluid is composed of solvents other than the glycols and contains castor oil as a base lubricant, the alkalinity must be imparted to the fluid by the less satisfactory amines and soaps. The mixture disclosed in this invention is soluble in alcohols, glycols, glycol-ethers, castor oil derivative and polyoxyglycols commonly found in brake fluids. When it is added to brake fluids or brake fluid components, the mixture individually lowers corrosive action on all six brake system metals. The mixture also increases storage stability of the brake fluid components by supplying a reserve alkalinity to the fluid which will neutralize organic acids which may be formed by oxidation of the organic constituents. The mixture has no deleterious effect on either natural or synthetic rubber components of brake systems, and is compatible with phenolic antioxidants.

Another property of this mixture which is particularly desirable for brake fluids and essential for a coolant mixture, is its solubility in water. It is soluble in and miscible with water in all proportions, and therefore is a suitable inhibitor for many coolants, whether they are diluted with water or are undiluted. Antifreeze constituents which may be inhibited by this mixture include alcohols, glycol-ethers, and glycols, many of which will not ordinarily dissolve in borax as such. In addition this mixture, being a liquid, can be readily packaged, conveniently handled, and may be added directly to cooling systems without fear of clogging radiator tubes. It is a radiator conditioner which may be used with all types of liquid heat transfer media and has a high potential as a marketable material.

Having particularly described this invention, what is claimed is:

1. The method of preparing a corrosion inhibiting additive composition for non-petroleum base hydraulic brake fluids composed of caster oil and its derivatives with mixtures of glycols, glycol-ethers, and polyoxyglycols, said method comprising heating 1,2-propylene glycol to 85° C. and adding powdered sodium tetraborate decahydrate in a total amount of 1 to 30% by weight of the 1,2-propylene glycol and in increments of 1 to 10% by weight of the 1,2-propylene glycol, maintaining the temperature at approximately 85° C. and stirring until the mixture becomes clear before the addition of each increment, and after the addition of the final increment heating to 105° C. and maintaining the solution at this temperature for three hours.

2. A corrosion inhibiting additive composition prepared by the method of claim 1.

3. A method of preparing a corrosion inhibiting additive composition for non-petroleum base hydraulic brake fluids composed of caster oil and its derivatives with mixtures of glycols, glycol-ethers, and polyoxyglycols, said method comprising adding to the 1,2-propylene glycol an amount of water corresponding to $(10-n)$ times the molar equivalent of sodium tetraborate to be added later, where $n$ represents the molar ratio of water of hydration associated with the said sodium tetraborate and is a number less than 10 and which may be zero, heating to 85° C., and then adding the said sodium tetraborate in a state of hydration corresponding to the formula $$Na_2B_4O_7 \cdot nH_2O$$

in a total amount of 1 to 30%, based on the weight of the 1,2-propylene glycol used, times the ratio of the molecular weight of $Na_2B_4O_7 \cdot nH_2O$ to $Na_2B_4O_7 \cdot 10H_2O$, and in increments of 1 to 10%, maintaining the temperature at approximately 85° C. and stirring until the mixture becomes clear before the addition of each increment, and after the addition of the final increment heating to 105° C. and maintaining the solution at this temperature for three hours.

4. A corrosion inhibiting additive composition prepared by the method of claim 1.

References Cited in the file of this patent

UNITED STATES PATENTS 2,979,524     Wright et al. _____ Apr. 11, 1961

UNITED STATES PATENT OFFICE
CERTIFICATE OF CORRECTION

Patent No. 3,087,959            April 30, 1963

Charles B. Jordan

It is hereby certified that error appears in the above numbered patent requiring correction and that the said Letters Patent should read as corrected below.

Column 4, line 21, for the claim reference numeral "1" read -- 3 --.

Signed and sealed this 19th day of November 1963.

(SEAL)
Attest:
ERNEST W. SWIDER

Attesting Officer

EDWIN L. REYNOLDS

Acting Commissioner of Patents